US012594857B2

(12) United States Patent
Larsson et al.

(10) Patent No.: US 12,594,857 B2
(45) Date of Patent: Apr. 7, 2026

(54) SYSTEM SOLUTION FOR TWO-PHASE ELECTRIC MACHINE USED FOR VEHICLE PROPULSION

(71) Applicant: Volvo Car Corporation, Gothenburg (SE)

(72) Inventors: Torbjörn Larsson, Gothenburg (SE); Jonas Forssell, Torslanda (SE); Joachim John David Härsjö, Kungälv (SE)

(73) Assignee: VOLVO CAR CORPORATION, Gothenburg (SE)

( * ) Notice: Subject to any disclaimer, the term of this patent is extended or adjusted under 35 U.S.C. 154(b) by 277 days.

(21) Appl. No.: 18/429,827

(22) Filed: Feb. 1, 2024

(65) Prior Publication Data

US 2025/0249792 A1     Aug. 7, 2025

(51) Int. Cl.
B60L 58/18 (2019.01)

(52) U.S. Cl.
CPC ........... B60L 58/18 (2019.02); *B60L 2210/10* (2013.01)

(58) Field of Classification Search
CPC .. B60L 15/2054; B60L 50/60; B60L 2240/30; B60L 2240/48; B60L 2250/16; B60L 2260/26
See application file for complete search history.

(56) References Cited

U.S. PATENT DOCUMENTS

| | | | |
|---|---|---|---|
| 5,622,789 A | 4/1997 | Young | |
| 7,612,530 B2 * | 11/2009 | Konishi | ................ H02J 7/0016 320/120 |

| | | | |
|---|---|---|---|
| 8,134,338 B2 | 3/2012 | Choi | |
| 9,362,757 B2 | 6/2016 | Deal et al. | |
| 9,891,286 B2 | 2/2018 | Fetzer et al. | |
| 10,056,654 B2 | 8/2018 | Butzmann et al. | |
| 10,205,327 B2 | 2/2019 | Okui | |
| 10,283,987 B1 | 5/2019 | Wang et al. | |
| 10,367,239 B1 | 7/2019 | Dao | |

(Continued)

FOREIGN PATENT DOCUMENTS

| | | |
|---|---|---|
| EP | 2 681 782 B1 | 1/2014 |
| EP | 2 705 564 B1 | 3/2014 |

(Continued)

OTHER PUBLICATIONS

Non-Final Office Action received for U.S. Appl. No. 17/565,583, dated Sep. 19, 2024, 33 pages.

(Continued)

*Primary Examiner* — Erez Gurari

(74) *Attorney, Agent, or Firm* — Amin, Turocy & Watson, LLP

(57) ABSTRACT

Vehicle propulsion using a two-phase electric machine (e.g., using a computerized tool) is enabled. For example, a two-phase electric drivetrain can comprise a plurality of cell-level control units. Each cell-level control unit of the plurality of cell-level control units can respectively comprise one or more battery cells, an h-bridge operable as a cell-level inverter, and a DC/DC converter, in parallel with the h-bridge, that converts battery cell voltage to an output voltage. The plurality of cell-level control units can be arranged into a pair of control unit strings comprising a first control unit string and a second control unit string.

20 Claims, 7 Drawing Sheets

(56) References Cited

U.S. PATENT DOCUMENTS

| | | | |
|---|---|---|---|
| 2009/0296442 | A1 | 12/2009 | Chang et al. |
| 2013/0127399 | A1 | 5/2013 | Tang et al. |
| 2015/0365788 | A1 | 12/2015 | Lidgren et al. |
| 2016/0226268 | A1 | 8/2016 | Okui |
| 2016/0365788 | A1 | 12/2016 | Singh et al. |
| 2017/0256984 | A1 | 9/2017 | Ding et al. |
| 2018/0175638 | A1 | 6/2018 | Zhu |
| 2020/0011934 | A1 | 1/2020 | Tabatowski-Bush et al. |
| 2020/0142004 | A1 | 5/2020 | Ito et al. |
| 2020/0164763 | A1 | 5/2020 | Holme |
| 2020/0207219 | A1 | 7/2020 | Slepchenkov et al. |
| 2020/0274368 | A1 | 8/2020 | Crouse, Jr. |
| 2020/0274370 | A1 | 8/2020 | Krieg |
| 2020/0361337 | A1 | 11/2020 | Ohmori |
| 2021/0126471 | A1 | 4/2021 | Srivastava et al. |
| 2021/0376629 | A1 | 12/2021 | Chen et al. |
| 2022/0274496 | A1* | 9/2022 | Gannamaneni ......... B60L 53/62 |
| 2023/0088653 | A1* | 3/2023 | Gannamaneni ........... H02J 7/36 429/7 |
| 2023/0134237 | A1* | 5/2023 | Wildgruber ............. B60R 16/03 307/9.1 |
| 2023/0182583 | A1* | 6/2023 | Bergqvist .............. H01M 50/51 429/149 |
| 2025/0035714 | A1* | 1/2025 | Mohamed Halick ... B60L 50/60 |
| 2025/0112577 | A1* | 4/2025 | Alam .................. H02M 1/4233 |

FOREIGN PATENT DOCUMENTS

| | | | |
|---|---|---|---|
| EP | 3 151 360 | A | 4/2017 |
| EP | 3 247 022 | A1 | 11/2017 |
| EP | 3 637 577 | | 4/2020 |
| EP | 4 046 856 | A1 | 8/2022 |
| EP | 108508 | A | 12/2022 |
| EP | 4 190 621 | A1 | 6/2023 |
| EP | 4 195 353 | A1 | 6/2023 |
| EP | 4199177 | A2 | 6/2023 |
| EP | 4199177 | A3 | 2/2024 |
| GB | 2584424 | A | 12/2020 |
| JP | 2021-19371 | A | 2/2021 |
| KR | 10-2137759 | B1 | 7/2020 |
| KR | 10-2180138 | B1 | 11/2020 |
| WO | 2020/219440 | A1 | 10/2020 |

OTHER PUBLICATIONS

Notice of Allowance received for U.S. Appl. No. 17/306,256, dated Jun. 21, 2024, 105 pages.

Communication pursuant to Article 94(3) received for European Patent Application No. 21188834.2, dated Nov. 13, 2024, 6 pages.

Notice of Allowance received for U.S. Appl. No. 17/306,248, dated Dec. 20, 2023, 24 pages.

Xia et al., "State-of-charge Balancing of Lithium-ion Batteries with State-of-health Awareness Capability", IEEE Transactions on Industry Applications Transaction, 2020, 12 pages.

Chowdhury et al., "An Integrated State of Health (SOH) Balancing Method for Lithium-Ion Battery Cells", IEEE, 2019, pp. 5759-5763.

Forssell et al., "Intelligent Battery Cell with Integrated Monitoring and Switches", U.S. Appl. No. 63/059,300, filed Jul. 31, 2020, 59 pages.

Ekstrom et al., "Intelligent Battery Cell", U.S. Appl. No. 63/246,483, filed Sep. 21, 2021, 54 pages.

International Search Report and Written Opinion received for PCT Application Serial No. PCT/EP2022/085528 dated Mar. 14, 2023, 13 pages.

Notice of Allowance received for U.S. Appl. No. 17/306,221, dated Dec. 18, 2024, 6 pages.

Notice of Allowance received for U.S. Appl. No. 17/306,221, dated Jan. 24, 2024, 6 pages.

LCSC Electronics, "Ai-Thinker ESP-12S", Shenzhen LCSC Electronics Technology Co., Ltd.https://lcsc.com/product-detail/WIFI-Modules_ESP-12S_C82898.html, 2020, Last Accessed Feb. 9, 2024, 3 pages.

Coilcraft.com, "MSD1514 Series", https://www.coilcraft.com/en-us/products/power/coupled-inductors/1-1-shielded-coupled/msd/msd 1514/, Copyright 2021, Coilcraft, Inc., 7 pages.

LCSC Electronics, "Ai-Thinker ESP-12S", https://lcsc.com/product-detail/WIFI-Modules_ESP-12S_C82898.html,2020 Shenzhen LCSC Electronics Technology Co., Ltd.

ROHM Co., "Calculation of Power Loss (Synchronous)", No. AEK59-D1-0065-2, 2016.10-Rev. 003, © 2016 ROHM Co., Ltd., 4 pages.

Extended European Search Report received for European Application No. 21188834.2 dated Dec. 10, 2021, 8 pages.

Communication pursuant to Rule 69 EPC received for European Patent Application No. 21188834.2 dated Feb. 7, 2022, 2 pages.

Non-Final Office Action received for U.S. Appl. No. 17/306,221, dated Feb. 6, 2023, 39 pages.

Communication pursuant to Article 94(3) EPC received for EP Patent Application Serial No. 21188834.2 dated Mar. 22, 2023, 4 pages.

Non-Final Office Action received for U.S. Appl. No. 17/306,230, dated May 11, 2023, 38 pages.

Communication pursuant to Rule 114(2) EPC received for EP Patent Application Serial No. 21188834.2 dated May 3, 2023, 3 pages.

Final Office Action received for U.S. Appl. No. 17/306,221, dated Jul. 17, 2023, 121 pages.

Notice of Allowance received for U.S. Appl. No. 17/306,221, dated Oct. 10, 2023, 36 pages.

Final Office Action received for U.S. Appl. No. 17/306,230, dated Oct. 10, 2023, 26 pages.

Ex Parte Quayle Action received for U.S. Appl. No. 17/306,248, dated Oct. 12, 2023, 39 pages.

Non- Final Office Action received for U.S. Appl. No. 17/306,256, dated Sep. 12, 2023, 58 pages.

Notice of Allowance received for U.S. Appl. No. 17/306,230, dated Jan. 8, 2024, 41 pages.

Correction Notice received for Chinese Patent Application No. 202510163994.7 dated Mar. 13, 2025, 2 pages (Including English Translation).

Notice of Allowance received for U.S. Appl. No. 17/565,583 dated Jul. 11, 2025, 9 pages.

Partial Supplementary European Search Report received for EP Patent Application Serial No. 25155301.2 dated Jul. 16, 2025, 14 pages.

Communication Pursuant to Rule 69 EPC received for EP Patent Application Serial No. 25157563.5 dated Aug. 25, 2025, 2 pages.

Notice of Allowance received for U.S. Appl. No. 17/306,230, dated Mar. 7, 2024, 13 pages.

Notice of Allowance received for U.S. Appl. No. 17/306,248, dated Mar. 28, 2024, 13 pages.

Final Office Action received for U.S. Appl. No. 17/306,256, dated March 21, 2024, 49 pages.

Final Office Action received for U.S. Appl. No. 17/565,583 dated Mar. 27, 2025, 11 pages.

Extended European Search Report received for European Application No. 25157563.5 dated Jun. 13, 2025, 8 pages.

Extended European Search Report received for EP Patent Application Serial No. 25155301.2 dated Oct. 31, 2025, 15 pages.

* cited by examiner

300

| | Switch/Contactor Number | | | | | | |
|---|---|---|---|---|---|---|---|
| | Battery Pack Separation | | | External Charging Control | | | |
| | | | | DC Charge | | AC Charge | |
| Usecase | 136 | 138 | 140 | 128 | 130 | 114 | 156 |
| Parked Vehicle, System off | 0 | 0 | 0 | 0 | 0 | 0 | 0 |
| Parkled Vehicle, Workshop Service Mode | 0 | 0 | 0 | 0 | 0 | 0 | 0 |
| Parked Vehicle, System On, Stand By | 1 | 1 | 0 | 0 | 0 | 0 | 0 |
| Driving, 2WD ERAD | 1 | 1 | 0 | 0 | 0 | 0 | 0 |
| AC Charging, 1-phase, 2S (N-L1) | 0 | 0 | 1 | 0 | 0 | 1 | 1 |
| DC Charging, 2S | 0 | 0 | 1 | 1 | 1 | 0 | 0 |
| Emergency Short Circuit of ERAD via SC Boards in Bypass | 1 | 1 | 0 | 0 | 0 | 0 | 0 |

Legend: 0 = Contactor Open; 1 = Contactor Closed

FIG. 3

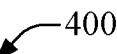

400

402 — DETERMINING MODE

404 — DRIVE MODE?

NO

YES

406 — CLOSING A PAIR OF LEG SWITCHES, WHEREIN THE PAIR OF LEG SWITCHES IS LOCATED RESPECTIVELY BETWEEN A TWO-PHASE ELECTRIC MACHINE AND A PAIR OF CONTROL UNIT STRINGS, WHEREIN CLOSING THE PAIR OF LEG SWITCHES ENABLES POWER SUPPLY FROM THE PAIR OF CONTROL UNIT STRINGS TO RESPECTIVE PHASES OF THE TWO-PHASE ELECTRIC MACHINE

408 — OPENING AN END SWITCH THAT PREVENTS CHARGING OF THE PAIR OF CONTROL UNIT STRINGS VIA AN EXTERNAL POWER SOURCE

FIG. 4

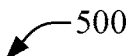

502 — DETERMINING MODE

504 — CHARGE MODE?

NO

YES

506 — OPENING A PAIR OF LEG SWITCHES, WHEREIN THE PAIR OF LEG SWITCHES IS LOCATED RESPECTIVELY BETWEEN A TWO-PHASE ELECTRIC MACHINE AND A PAIR OF CONTROL UNIT STRINGS, WHEREIN OPENING THE PAIR OF LEG SWITCHES DISCONNECTS THE PAIR OF CONTROL UNIT STRINGS FROM THE TWO-PHASE ELECTRIC MACHINE

508 — CLOSING AN END SWITCH THAT ENABLES CHARGING OF THE PAIR OF CONTROL UNIT STRINGS VIA AN EXTERNAL POWER SOURCE

FIG. 5

SYSTEM SOLUTION FOR TWO-PHASE ELECTRIC MACHINE USED FOR VEHICLE PROPULSION

TECHNICAL FIELD

The disclosed subject matter relates to electric vehicles (e.g., any type of vehicle that can be propelled using an electric machine and a battery) and, more particularly, to vehicle propulsion using a two-phase electric machine.

BACKGROUND

Conventional electric vehicles utilize converters with integrated controllers to convert DC-voltage from a battery into varying voltage to accommodate charge to/from a grid, drive electrical motors, and adopt battery voltage to 400V and 800V DC chargers. Conventional electric vehicles also utilize three-phase electric motors. Such conventional electric vehicles, however, are costly to produce.

The above-described background relating to electric vehicles is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products that facilitate vehicle propulsion using a two-phase electric machine are described.

As alluded to above, electric vehicles can be improved in various ways, and various embodiments are described herein to this end and/or other ends.

According to an embodiment, a two-phase electric drivetrain can comprise a plurality of cell-level control units, wherein each cell-level control unit of the plurality of cell-level control units respectively comprises one or more battery cells, an h-bridge operable as a cell-level inverter, and a DC/DC converter, in parallel with the h-bridge, that converts battery cell voltage to an output voltage wherein the plurality of cell-level control units is arranged into a pair of control unit strings comprising a first control unit string and a second control unit string.

According to another embodiment, a vehicle can comprise a two-phase electric drivetrain, comprising a plurality of cell-level control units, wherein each cell-level control unit of the plurality of cell-level control units respectively comprises one or more battery cells, an h-bridge operable as a cell-level inverter, and a DC/DC converter, in parallel with the h-bridge, that converts battery cell voltage to an output voltage wherein the plurality of cell-level control units is arranged into a pair of control unit strings comprising a first control unit string and a second control unit string.

According to yet another embodiment, a method for propelling an electric vehicle can comprise closing a pair of leg switches, wherein the pair of leg switches is located respectively between a two-phase electric machine and a pair of control unit strings, wherein closing the pair of leg switches enables power supply from the pair of control unit strings to respective phases of the two-phase electric machine, and opening an end switch that prevents charging of the pair of control unit strings via an external power source, wherein each control unit string of the pair of control unit strings comprises a respective plurality of cell-level control units, wherein each cell-level control unit of the respective plurality of cell-level control units respectively comprises one or more battery cells, an h-bridge operable as a cell-level inverter, and a DC/DC converter, in parallel with the h-bridge, that converts battery cell voltage to an output voltage.

BRIEF DESCRIPTION OF DRAWINGS

FIG. 3 illustrates a table representing a control logic associated with a vehicle in accordance with one or more embodiments described herein.

FIG. 4 illustrates a block flow diagram for a process associated with two-phase electric machine propulsion in accordance with one or more embodiments described herein.

FIG. 5 illustrates a block flow diagram for a process associated with vehicle charging in accordance with one or more embodiments described herein.

DETAILED DESCRIPTION

Figure 1:
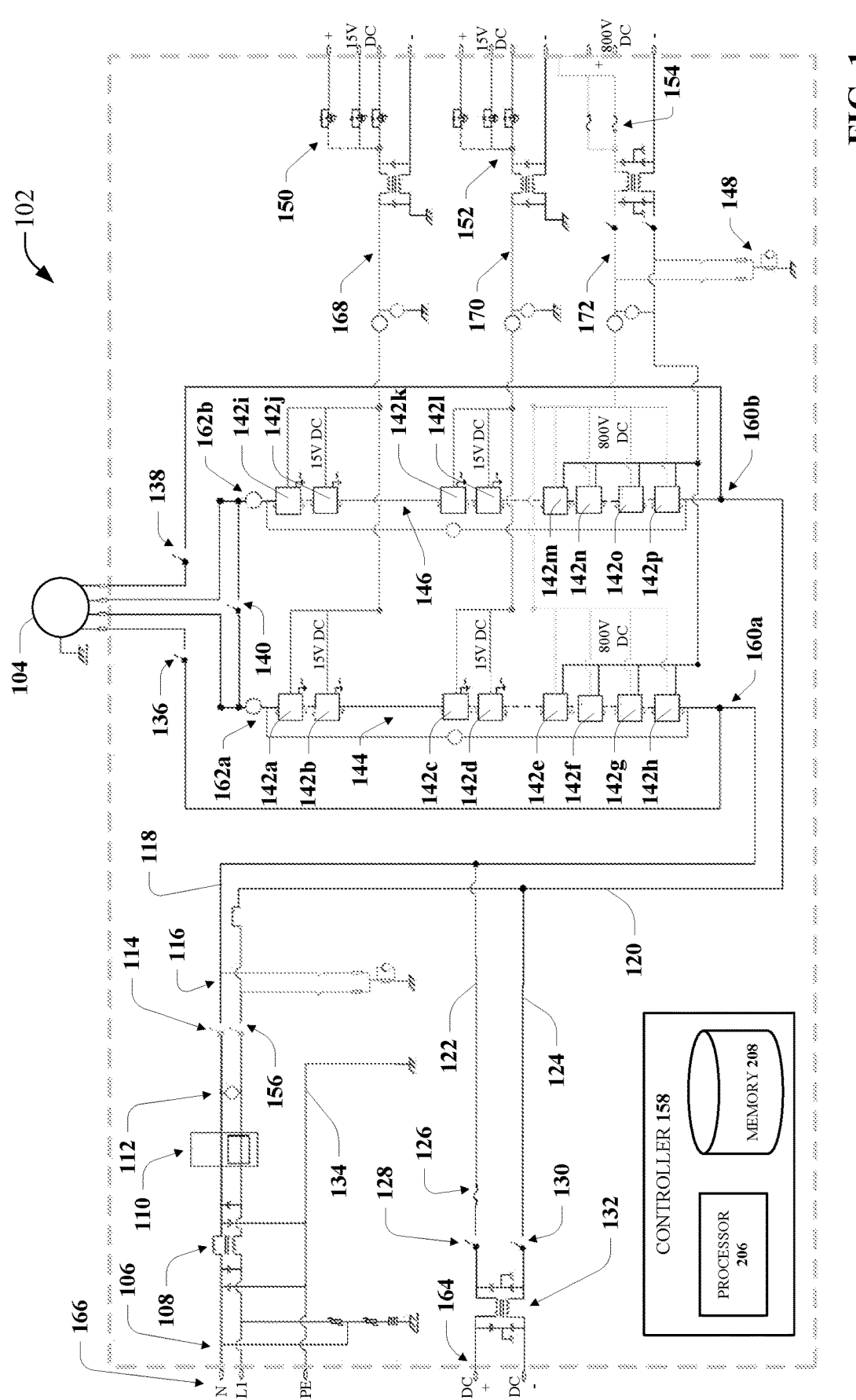
FIG. 1 illustrates a block diagram of an example electrical architecture of a vehicle in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

The computer processing systems, computer-implemented methods, apparatus and/or computer program products described herein employ hardware and/or software to solve problems that are highly technical in nature, that are not abstract and cannot be performed as a set of mental acts by a human.

Utilization of a two-phase electric machine and corresponding architecture can enable reduction in cost of a corresponding vehicle, increase efficiency, and facilitate improved electromagnetic compatibility (EMC) performance. EMC can be reduced, for instance, because a corresponding two-phase electric machine can be fed by pair of cables to each phase, and currents to/from the phase can cancel out corresponding fields.

By using a two-phase electric machine instead of a three-phase electric machine, the amount of hardware needed in the corresponding drivetrain can be reduced, this lower production costs of a corresponding electric vehicle. Further, by utilizing a battery pack of a plurality of cells organized into two strings (e.g., for a two-phase electric machine), rather than three strings (e.g., for a three-phase electric machine), higher voltage with fewer cells in a corresponding battery pack can be realized, which can reduce currents in corresponding phases, and can yield increased efficiency of a corresponding two-phase electric vehicle. Further, larger battery cells can be utilized per board for the same size of battery, which can lower the cost per unit energy. The foregoing can also enable higher voltages with fewer cells in a respective battery pack, because instead of dividing cells into three strings (e.g., for a three-phase electric machine), embodiments herein can divide a battery pack into two strings, meaning that not as many cells are needed to achieve the same voltage (e.g., as compared to a three-string battery), and embodiments herein can thus achieve higher voltages with the same number of cells, as compared to three-phase propulsion systems.

Turning now to FIG. 1, there is illustrated an example, non-limiting electrical architecture of a vehicle 102 in accordance with one or more embodiments herein. It is noted that the vehicle 102 can comprise a two-phase electric drivetrain. While the vehicle 102 can comprise an automobile, the vehicle 102 is not so limited. Example vehicles 102 can comprise, but are not limited to, automobiles (e.g., autonomous vehicles), airplanes, trains, motorcycles, carts, trucks, semi-trucks, buses, boats, recreational vehicles, helicopters, jets, electric scooters, electric bicycles, vehicle chargers, vehicle charging stations, a combination thereof, and/or the like. It is additionally noted that the vehicle 102 can comprise a battery electric vehicle, hybrid vehicle, plug-in hybrid vehicle, or other suitable types of vehicles.

In various embodiments, the vehicle 102 can comprise one or more of a variety of components, such as a two-phase electric machine 104, surge protector 106, electromagnetic interference (EMI) filter 108, residual breaker 110, voltage measurement component 112, switch 114 (e.g., comprising an inductor), insulation monitoring device (IMD) 116, neutral line 118, L1 (AC) line 120, DC+ line 122, DC− line 124, fuse 126 (e.g., a 600 amp fuse or another suitable fuse), switch 128, switch 130, EMI filter 132 (e.g., a ferrite EMI filter), protective earth (PE) line 134, switch 136 (e.g., a leg switch), switch 138 (e.g., a leg switch), switch 140 (e.g., an end switch), one or more cell-level control units 142 (e.g., cell-level control unit 142a, cell-level control unit 142b, cell-level control unit 142c, cell-level control unit 142d, cell-level control unit 142e, cell-level control unit 142f, cell-level control unit 142g, cell-level control unit 142h, cell-level control unit 142i, cell-level control unit 142j, cell-level control unit 142k, cell-level control unit 142l, cell-level control unit 142m, cell-level control unit 142n, cell-level control unit 142o, and/or cell-level control unit 142p), control unit string 144 (e.g., a first control unit string), control unit string 146 (e.g., a second control unit string), IMD 148, fuses 150 (e.g., smart fuses), fuses 152 (e.g., smart fuses), fuses 154 (e.g., 50 amp fuses or other suitable fuses), switch 156, controller 158 (e.g., comprising processor 206 and/or memory 208), end 160a, end 160b, end 162a, end 162b, DC charging terminal 164, AC charging terminal 166, DC output 168, DC output 170, and/or DC output 172).

In various embodiments, a vehicle 102 can comprise a two-phase electric drivetrain. In various embodiments, a battery pack of the two-phase electric drivetrain can comprise a plurality of cell-level control units 142. It is noted that the number of battery cells 220 and cell-level control units 142 can vary depending on application (e.g., by voltage needed in a control unit string). In this regard, the higher the string voltage needed, the more battery cells 220 and/or cell-level control units 142 can be utilized in a corresponding battery pack. So, for example, a small vehicle with a relatively small battery pack can comprise fewer battery cells 220 and/or cell-level control units 142 than a relatively larger vehicle with a relatively larger battery pack. In various embodiments, each cell-level control unit 142 can respectively comprise one or more battery cells 220 and an h-bridge 212 operable as a cell-level inverter. In various embodiments, the plurality of cell-level control units 142 can arranged into a pair of control unit strings comprising a first control unit string (e.g., control unit string 144) and a second control unit string (e.g., control unit string 146).

In various embodiments, first respective cell-level control units 142 of the first control unit string 144 can be electrically connected in series. Similarly, second respective cell-level control units 142 of the second control unit string 146 can be electrically connected in series.

In various embodiments, the pair of control unit strings can respectively comprise first ends (e.g., end 160a and end 160b) and second ends (e.g., end 162a and end 162b), opposite the first ends. In this regard, respective first ends (e.g., end 160a and end 160b) of the pair of control unit strings (e.g., control unit strings 144 and 146) can be electrically connected to a charging terminal (e.g., DC charging terminal 164 or AC charging terminal 166).

In various embodiments, respective second ends (e.g., end 162a and end 162b) of the pair of control unit strings can be electrically connected to an end switch (e.g., switch 140) that enables charging of the pair of control unit strings in series and to a two-phase electric machine 104. In various embodiments, the two-phase electric machine 104 can comprise a permanent-magnet synchronous machine (PMSM). In further embodiments, the two-phase electric machine 104 can comprise an asynchronous motor (ASM). For instance, by closing the end switch 140 (e.g., via the controller 158), battery cells 220 of respective cell-level control units 142 of the first control unit string 144 and the second control unit string 146 can be charged in series (e.g., the first control unit string 144 and the second control unit string 146 can be charged in series) via AC or DC charging. In this regard, the two-phase electric drivetrain can further comprise further comprise a pair of leg switches (e.g., switches 136 and 138) respectively between the two-phase electric machine 104 and the pair of control unit strings. In various embodiments, closing the pair of leg switches (e.g., switches 136 and 138)

can enable power supply from the pair of control unit strings to respective phases of the two-phase electric machine 104. In this regard, the first control unit string 144 and the second control unit string 146 are respectively connected to separate phases of the two-phase electric machine 104.

In various embodiments, each cell-level control 142 can comprise an H-bridge 212 and DC/DC converter 214 to produce DC 400V, DC 800V, DC 15V, or another suitable voltage. The DC/DC converter 214 can be directly connected to the battery cells 220, and thereby works in parallel with the H-bridge 212. The control of the DC/DC converter 214 and H-bridge 212 are independent, for instance, so that power can be produced independently. In an embodiment, the H-bridge 212 can be utilized for propulsion and DC/DC converter 214 can generate 400V DC for load feed in the electrical system of a vehicle (e.g., climate loads). In another embodiment, the H-bridge 212 can be utilized for propulsion and DC/DC converter 214 can generate 15V DC for load feed in the electrical system of a vehicle (e.g., for low voltage loads).

Is it noted that any quantity of cell-level control units 142 can be adjustably connected (e.g., via h-bridges 212 controlled via the controller 204) in series and/or in parallel to achieve any suitable voltage and/or current.

Figure 2:
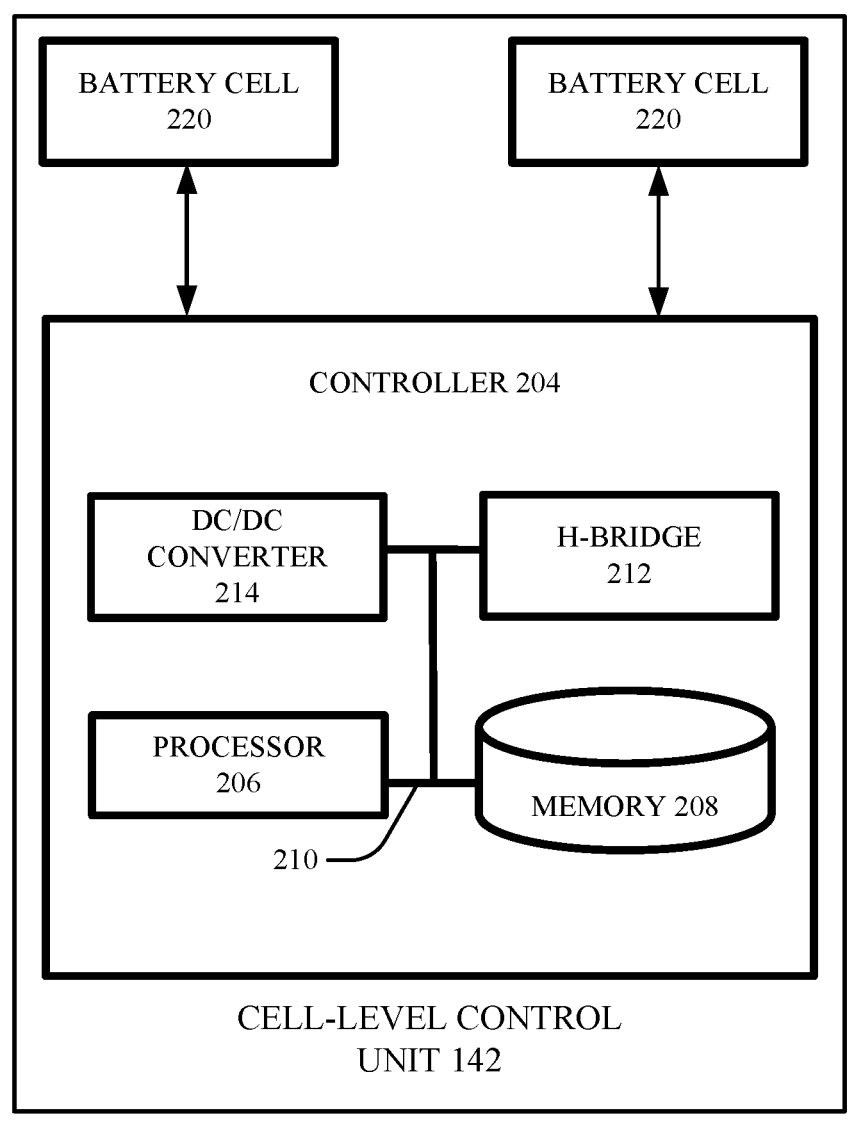
FIG. 2 illustrates a block diagram of an example cell-level control unit in accordance with one or more embodiments described herein.

Turning now to FIG. 2, there is illustrated a block diagram of an example cell-level control unit 142 in accordance with one or more embodiments described herein. The cell-level control unit 142 can comprise one or more battery cells 220, such as a plurality of battery cells 220. Each battery cell 220 can be a power source in itself and can comprise any suitable materials, including any suitable material for retaining charge. The battery cells 220 can be connected to one another, such as via pole connectors of the battery cells 220. In various embodiments, the battery cells 220 can comprise approximately 4V battery cells. In various embodiments, the cell-level control unit 142 can comprise four battery cells 220, or another suitable quantity of battery cells 220, thus yielding approximately 16 volts or another suitable voltage per cell-level control unit 142.

In various embodiments, a plurality of cell-level control units 142 can be part of a battery pack of a vehicle 102. The plurality of cell-level control units 142 can thus form a battery system or battery pack. Such a battery system essentially forms one mounting unit, which therefore facilitates ease of manipulation and assembly into a corresponding vehicle 102.

In various embodiments, a controller 204 can control usage of the cells 220, and an h-bridge 212 of the controller 204 can facilitate connection, disconnection and/or bypass of individual cells 220 to one another and/or to an external apparatus.

In various embodiments, any suitable number of switches, transistors, capacitors and/or other circuit elements can be comprised by the h-bridge 212. The switches and/or transistors can be operated, for instance, via control by the comprising controller 204, such as to facilitate current flow between an external component and the battery cells 220.

In various embodiments, the controller 204 can be connected by any suitable means, such as communicatively and/or electrically connected, to one or more of the battery cells 220. In one or more embodiments, the controller 204 can be generally connected to each of the cells 220.

In various embodiments, the controller 204 (e.g., controller board) can be welded directly and/or indirectly onto cell poles of the battery cells 220, and the controller 204 can be powered by the battery cells 220. In various embodiments, the controller 204 can comprise any suitable components, such as a processor 206, bus 210, and/or memory 208 for monitoring, controlling, and/or generally communicating with the cells 220. That is, the cells 220 can be commonly controlled by the same controller 204 of a respective cell-level control unit 142.

In various embodiments, the controller 204 can be connected (e.g., communicatively, electrically, operatively, optically, etc.) to one or more cells 220, and/or to one or more external systems, sources, and/or devices (e.g., classical and/or quantum computing devices, communication devices, etc.) via a network. The network can comprise one or more wired and/or wireless networks, including, but not limited to, a cellular network, a wide area network (WAN) (e.g., the Internet), and/or a local area network (LAN). For example, the cell-level control unit 142 can communicate, such as via the controller 204, with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, controller 204 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between cell-level control unit 142 and external systems, sources, and/or devices (e.g., computing devices, communication devices, etc.).

In various embodiments, the controller 204 can monitor cell states of the cells 220. Based on the cell states, the controller 204 can determine, such as generate, an order for electrically connecting the cells 220 to an external apparatus for current flow between the external apparatus and the multi-cell battery string. The order can be a time-based order, such as where certain battery cells 220 are connected in time prior to, during or after other battery cells 220. The connection can be for charging and/or discharging of the cells 220. The connection can be made by any suitable component, such as the h-bridge 212 having one or more switches, transistors and/or the like.

In various embodiments, the processor 206 can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor 206 can perform various operations that can be specified by such computer and/or machine readable, writable, and/or executable components and/or instructions including, but not limited to, logic, control, input/output (I/O), arithmetic, and/or the like. The processor 206 can comprise one or more central processing unit (CPU), multi-core processor, microprocessor, dual microprocessors, microcontroller, System on a Chip (SOC), array processor, vector processor, quantum processor, and/or another type of processor. Such examples of the processor can be employed to implement any embodiments described herein. In an example embodiment, the processor 206 can comprise a central processing unit (CPU) such as, for example, a microprocessor.

In various embodiments, the memory 208 can store one or more computer and/or machine readable, writable, and/or executable components and/or instructions that, when executed by the processor 206 (e.g., a classical processor, a quantum processor, etc.), can facilitate performance of operations defined by the executable component(s) and/or instruction(s). For example, the memory 208 can store computer and/or machine readable, writable, and/or executable components and/or instructions that, when executed by the processor 206, can facilitate execution of the various functions described herein relating to the controller 204.

In various embodiments, the memory 208 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory 208 can be employed to implement any embodiments described herein.

In various embodiments, bus 210 can comprise one or more of a memory bus, memory controller, peripheral bus, external bus, local bus, quantum bus and/or another type of bus that can employ one or more bus architectures. One or more of these examples of bus 210 can be employed to implement one or more embodiments described herein.

FIG. 3 illustrates a table 300 representing a control logic associated with a vehicle in accordance with one or more embodiments described herein. For instance, when the vehicle 102 is parked, switches 136, 138, 140, 128, 130, 114, and 156 can be open (e.g., as controlled via controller 158). Similarly, when the vehicle 102 is in a workshop service mode, switches 136, 138, 140, 128, 130, 114, and 156 can be open (e.g., as controlled via controller 158). When the vehicle 102 is on and in a standby mode, switches 136 and 138 can be closed, and switches 140, 128, 130, 114, and 156 can be open (e.g., as controlled via controller 158). Similarly, when the vehicle is in a driving mode, switches 136 and 138 can be closed, and switches 140, 128, 130, 114, and 156 can be open (e.g., as controlled via controller 158). When the vehicle 102 is in an AC charging mode, switches 140, 114, and 156 can be closed, and switches, 136, 138, 128, and 130 can be open (e.g., as controlled via controller 158). When the vehicle 102 is in a DC charging mode, switches 140, 128, and 130 can be closed, and switches 136, 138, 114, and 156 can be open (e.g., as controlled via controller 158). In an emergency short circuit mode, switches 136 and 138 can be closed, and switches 140, 128, 130, 114, and 156 can be open (e.g., as controlled via controller 158).

FIG. 4 illustrates a block flow diagram for a process 400 associated with two-phase electric machine propulsion in accordance with one or more embodiments described herein. At 402, the process 400 can comprise determining (e.g., via the controller 158) a mode applicable to the vehicle 102. At 404, if the vehicle is in a drive mode (e.g., YES at 404), the process 400 can proceed to 406. If at 404, the vehicle is not in a drive mode (e.g., NO at 404), the process 400 can return to 402. At 406, the process 400 can comprise, closing (e.g., via controller 158) a pair of leg switches (e.g., switches 136 and 138), wherein the pair of leg switches (e.g., switches 136 and 138) is located respectively between a two-phase electric machine 104 and a pair of control unit strings (e.g., control unit strings 144 and 146), and wherein closing the pair of leg switches (e.g., switches 136 and 138) enables power supply from the pair of control unit strings (e.g., control unit strings 144 and 146) to respective phases of the two-phase electric machine 104. At 408, the process 400 can comprise opening an end switch (e.g., switch 140) that prevents charging of the pair of control unit strings (e.g., control unit strings 144 and 146) via an external power source (e.g., a DC charger via DC charging terminal 164 or an AC charger via AC charging terminal 166).

FIG. 5 illustrates a block flow diagram for a process 500 associated with vehicle charging in accordance with one or more embodiments described herein. At 502, the process 500 can comprise determining (e.g., via the controller 158) a mode applicable to the vehicle 102. At 504, if the vehicle is in a charge mode (e.g., YES at 504), the process 500 can proceed to 506. If at 504, the vehicle is not in a drive mode (e.g., NO at 504), the process 500 can return to 502. At 506, the process 500 can comprise, opening (e.g., via controller 158) a pair of leg switches (e.g., switches 136 and 138), wherein the pair of leg switches (e.g., switches 136 and 138) is located respectively between a two-phase electric machine 104 and a pair of control unit strings (e.g., control unit strings 144 and 146), and wherein opening the pair of leg switches (e.g., switches 136 and 138) disconnects the pair of control unit strings (e.g., control unit strings 144 and 146) from the two-phase electric machine 104. At 508, the process 500 can comprise closing an end switch (e.g., switch 140) that enables charging of the pair of control unit strings (e.g., control unit strings 144 and 146) via an external power source (e.g., a DC charger via DC charging terminal 164 or an AC charger via AC charging terminal 166).

Systems/vehicles described herein can be coupled (e.g., communicatively, electrically, operatively, optically, inductively, acoustically, etc.) to one or more local or remote (e.g., external) systems, sources, and/or devices (e.g., electronic control systems (ECU), classical and/or quantum computing devices, communication devices, etc.). For example, vehicle 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, inductively, acoustically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, vehicle 102 can communicate with one or more local or remote (e.g., external) systems, sources, and/or devices, for instance, computing devices using such a network, which can comprise virtually any desired wired or wireless technology, including but not limited to: powerline ethernet, VHF, UHF, AM, wireless fidelity (Wi-Fi), BLU- ETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 602.XX wireless technologies and/or legacy telecommunication technologies, Session Initiation Protocol (SIP), ZIG-BEE®, RF4CE protocol, WirelessHART protocol, L-band voice or data information, 6LoWPAN (IPv6 over Low power Wireless Area Networks), Z-Wave, an ANT, an ultra-wideband (UWB) standard protocol, and/or other proprietary and non-proprietary communication protocols. In this example, vehicle 102 can thus include hardware (e.g., a central processing unit (CPU), a transceiver, a decoder, an antenna (e.g., a ultra-wideband (UWB) antenna, a BLU-ETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a processing unit 206 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processing unit 206) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a vehicle 102 or any other system or device described herein) can comprise a computing device, a general-purpose computer, field-programmable gate array, AI accelerator application-specific integrated circuit, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, wearable device, internet of things device, a cell phone, a smart phone, a consumer appliance and/or instrumentation, an industrial and/or commercial device, a digital assistant, a multimedia Internet enabled phone, a multimedia players, and/or another type of device.

Figure 6:
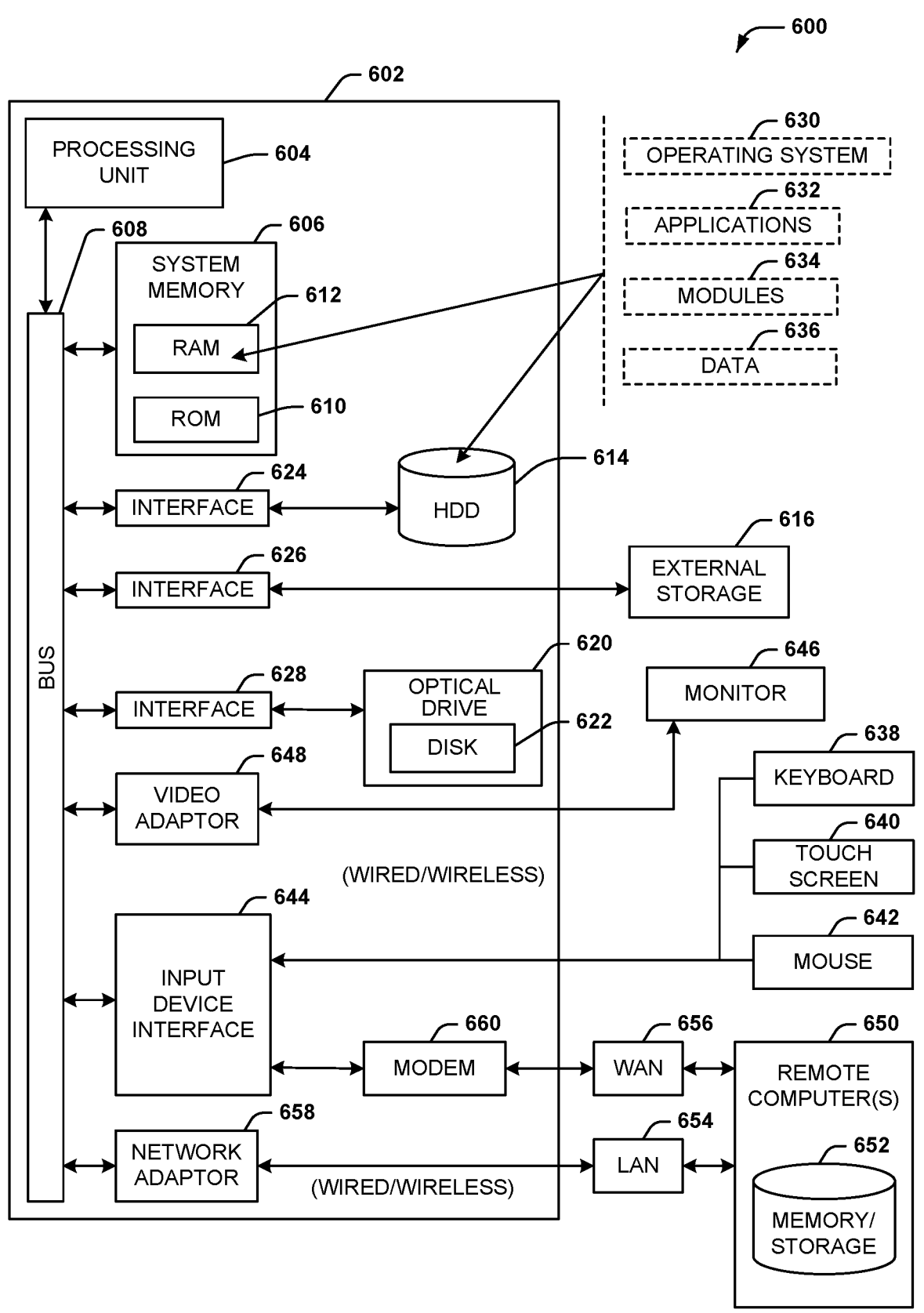
FIG. 6 is an example, non-limiting computing environment in which one or more embodiments described herein can be implemented.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers (e.g., ruggedized personal computers), field-programmable gate arrays, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, optic, infrared, and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors, field-programmable gate array, AI accelerator application-specific integrated circuit, or other suitable processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a nonvolatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data. It is noted that unified Extensible Firmware Interface(s) can be utilized herein.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a disk 622 such as a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enabled with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
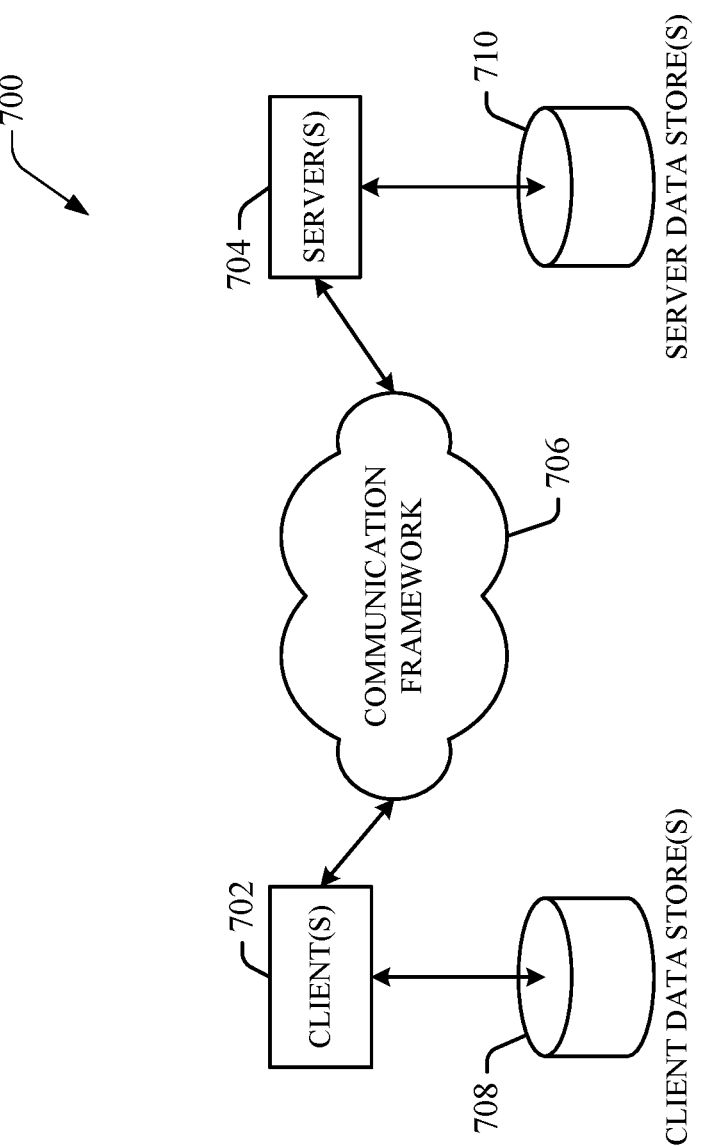
FIG. 7 is an example, non-limiting networking environment in which one or more embodiments described herein can be implemented.

Referring now to FIG. 7, there is illustrated a schematic block diagram of a computing environment 700 in accordance with this specification. The system 700 includes one or more client(s) 702, (e.g., computers, smart phones, tablets, cameras, PDA's). The client(s) 702 can be hardware and/or software (e.g., threads, processes, computing devices). The client(s) 702 can house cookie(s) and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform transformations of media items by employing aspects of this disclosure, for example. One possible communication between a client 702 and a server 704 can be in the form of a data packet adapted to be transmitted between two or more computer processes wherein data packets may include coded analyzed headspaces and/or input. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704. Further, the client(s) 702 can be operatively connected to one or more server data store(s) 710.

In one exemplary implementation, a client 702 can transfer an encoded file, (e.g., encoded media item), to server 704. Server 704 can store the file, decode the file, or transmit the file to another client 702. It is noted that a client 702 can also transfer uncompressed file to a server 704 and server 704 can compress the file and/or transform the file in accordance with this disclosure. Likewise, server 704 can encode information and transmit the information via communication framework 706 to one or more clients 702.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A two-phase electric drivetrain, comprising:
a plurality of cell-level control units, wherein each cell-level control unit of the plurality of cell-level control units respectively comprises:
one or more battery cells,
an h-bridge operable as a cell-level inverter,
a DC/DC converter, in parallel with the h-bridge, that converts battery cell voltage to an output voltage,
wherein the plurality of cell-level control units is arranged into a pair of control unit strings comprising a first control unit string and a second control unit string.

2. The two-phase electric drivetrain of any preceding clause, wherein first respective cell-level control units of the first control unit string are electrically connected in series, and
wherein second respective cell-level control units of the second control unit string are electrically connected in series.

3. The two-phase electric drivetrain of any preceding clause,
wherein the pair of control unit strings respectively comprise first ends and second ends, opposite the first ends, and
wherein respective first ends of the pair of control unit strings are electrically connected to a charging terminal.

4. The two-phase electric drivetrain of any preceding clause, wherein respective second ends of the pair of control unit strings are electrically connected to an end switch that enables charging of the pair of control unit strings in series and to a two-phase electric machine.

5. The two-phase electric drivetrain of any preceding clause, further comprising:
a pair of leg switches respectively between the two-phase electric machine and the pair of control unit strings, wherein closing the pair of leg switches enables power supply from the pair of control unit strings to respective phases of the two-phase electric machine.

6. The two-phase electric drivetrain of any preceding clause, wherein the output voltage comprises DC 400V or DC 800V.

7. The two-phase electric drivetrain of any preceding clause, wherein the output voltage comprises DC 15V.

8. The two-phase electric drivetrain of clause 1 above with any set of combinations of the two-phase electric drivetrains 2-7 above.

9. A vehicle comprising:
a two-phase electric drivetrain, comprising:
a plurality of cell-level control units, wherein each cell-level control unit of the plurality of cell-level control units respectively comprises:
one or more battery cells,
an h-bridge operable as a cell-level inverter, and
a DC/DC converter, in parallel with the h-bridge, that converts battery cell voltage to an output voltage,
wherein the plurality of cell-level control units is arranged into a pair of control unit strings comprising a first control unit string and a second control unit string.

10. The vehicle of any preceding clause,
wherein first respective cell-level control units of the first control unit string are electrically connected in series, and
wherein second respective cell-level control units of the second control unit string are electrically connected in series.

11. The vehicle of any preceding clause,
wherein the pair of control unit strings respectively comprise first ends and second ends, opposite the first ends, and
wherein respective first ends of the pair of control unit strings are electrically connected to a charging terminal.

12. The vehicle of any preceding clause, wherein respective second ends of the pair of control unit strings are electrically connected to an end switch that enables charging of the pair of control unit strings in series and to a two-phase electric machine.

13. The vehicle of any preceding clause, further comprising:
   a pair of leg switches respectively between the two-phase electric machine and the pair of control unit strings, wherein closing the pair of leg switches enables power supply from the pair of control unit strings to respective phases of the two-phase electric machine.

14. The vehicle of any preceding clause, wherein the output voltage comprises DC 400V or DC 800V.

15. The vehicle of any preceding clause, wherein the output voltage comprises DC 15V.

16. The vehicle of clause 9 above with any set of combinations of the vehicles 10-15 above.

17. A method for propelling an electric vehicle comprising:
   closing a pair of leg switches, wherein the pair of leg switches is located respectively between a two-phase electric machine and a pair of control unit strings, wherein closing the pair of leg switches enables power supply from the pair of control unit strings to respective phases of the two-phase electric machine; and
   opening an end switch that prevents charging of the pair of control unit strings via an external power source,
   wherein each control unit string of the pair of control unit strings comprises a respective plurality of cell-level control units, wherein each cell-level control unit of the respective plurality of cell-level control units respectively comprises:
      one or more battery cells,
      an h-bridge operable as a cell-level inverter, and
      a DC/DC converter, in parallel with the h-bridge, that converts battery cell voltage to an output voltage.

18. The method of any preceding clause,
   wherein first respective cell-level control units of a first control unit string of the pair of control unit strings are electrically connected in series, and
   wherein second respective cell-level control units of a second control unit string of the pair of control unit strings are electrically connected in series.

19. The method of any preceding clause,
   wherein the pair of control unit strings respectively comprise first ends and second ends, opposite the first ends, and
   wherein respective first ends of the pair of control unit strings are electrically connected to a charging terminal.

20. The method of any preceding clause, wherein respective second ends of the pair of control unit strings are electrically connected to an end switch that enables charging of the pair of control unit strings in series and to a two-phase electric machine.

21. The method of any preceding clause, wherein the output voltage comprises DC 400V or DC 800V.

22. The method of any preceding clause, wherein the output voltage comprises DC 15V.

23. The method of clause 17 above with any set of combinations of the methods of clauses 18-22 above.

What is claimed is:

1. A two-phase electric drivetrain, comprising:
   a plurality of cell-level control units, wherein each cell-level control unit of the plurality of cell-level control units respectively comprises:
      one or more battery cells,
      an h-bridge operable as a cell-level inverter, and
      a DC/DC converter, in parallel with the h-bridge, that converts battery cell voltage to an output voltage, wherein the plurality of cell-level control units is arranged into a pair of control unit strings comprising a first control unit string and a second control unit string.

2. The two-phase electric drivetrain of claim 1,
   wherein first respective cell-level control units of the first control unit string are electrically connected in series, and
   wherein second respective cell-level control units of the second control unit string are electrically connected in series.

3. The two-phase electric drivetrain of claim 1,
   wherein the pair of control unit strings respectively comprise first ends and second ends, opposite the first ends, and
   wherein respective first ends of the pair of control unit strings are electrically connected to a charging terminal.

4. The two-phase electric drivetrain of claim 1, wherein respective second ends of the pair of control unit strings are electrically connected to an end switch that enables charging of the pair of control unit strings in series and to a two-phase electric machine.

5. The two-phase electric drivetrain of claim 4, further comprising:
   a pair of leg switches respectively between the two-phase electric machine and the pair of control unit strings, wherein closing the pair of leg switches enables power supply from the pair of control unit strings to respective phases of the two-phase electric machine.

6. The two-phase electric drivetrain of claim 1, wherein the output voltage comprises DC 400V or DC 800V.

7. The two-phase electric drivetrain of claim 1, wherein the output voltage comprises DC 15V.

8. A vehicle comprising:
   a two-phase electric drivetrain, comprising:
      a plurality of cell-level control units, wherein each cell-level control unit of the plurality of cell-level control units respectively comprises:
         one or more battery cells,
         an h-bridge operable as a cell-level inverter, and
         a DC/DC converter, in parallel with the h-bridge, that converts battery cell voltage to an output voltage,
      wherein the plurality of cell-level control units is arranged into a pair of control unit strings comprising a first control unit string and a second control unit string.

9. The vehicle of claim 8,
   wherein first respective cell-level control units of the first control unit string are electrically connected in series, and
   wherein second respective cell-level control units of the second control unit string are electrically connected in series.

10. The vehicle of claim 8,
   wherein the pair of control unit strings respectively comprise first ends and second ends, opposite the first ends, and
   wherein respective first ends of the pair of control unit strings are electrically connected to a charging terminal.

11. The vehicle of claim 8, wherein respective second ends of the pair of control unit strings are electrically connected to an end switch that enables charging of the pair of control unit strings in series and to a two-phase electric machine.

12. The vehicle of claim 11, further comprising:
   a pair of leg switches respectively between the two-phase electric machine and the pair of control unit strings, wherein closing the pair of leg switches enables power supply from the pair of control unit strings to respective phases of the two-phase electric machine.

13. The vehicle of claim 8, wherein the output voltage comprises DC 400V or DC 800V.

14. The vehicle of claim 8, wherein the output voltage comprises DC 15V.

15. A method for propelling an electric vehicle comprising:

closing a pair of leg switches, wherein the pair of leg switches is located respectively between a two-phase electric machine and a pair of control unit strings, wherein closing the pair of leg switches enables power supply from the pair of control unit strings to respective phases of the two-phase electric machine; and opening an end switch that prevents charging of the pair of control unit strings via an external power source, wherein each control unit string of the pair of control unit strings comprises a respective plurality of cell-level control units, wherein each cell-level control unit of the respective plurality of cell-level control units respectively comprises:

one or more battery cells, an h-bridge operable as a cell-level inverter, and a DC/DC converter, in parallel with the h-bridge, that converts battery cell voltage to an output voltage.

16. The method of claim 15, wherein first respective cell-level control units of a first control unit string of the pair of control unit strings are electrically connected in series, and wherein second respective cell-level control units of a second control unit string of the pair of control unit strings are electrically connected in series.

17. The method of claim 15, wherein the pair of control unit strings respectively comprise first ends and second ends, opposite the first ends, and wherein respective first ends of the pair of control unit strings are electrically connected to a charging terminal.

18. The method of claim 15, wherein respective second ends of the pair of control unit strings are electrically connected to an end switch that enables charging of the pair of control unit strings in series and to a two-phase electric machine.

19. The method of claim 15, wherein the output voltage comprises DC 400V or DC 800V.

20. The method of claim 15, wherein the output voltage comprises DC 15V.

* * * * *